US012387643B2

(12) United States Patent
Kwon et al.

(10) Patent No.: US 12,387,643 B2
(45) Date of Patent: Aug. 12, 2025

(54) DISPLAY DEVICE, AND METHOD OF OPERATING A DISPLAY DEVICE

(71) Applicant: Samsung Display Co., LTD., Yongin-si (KR)

(72) Inventors: Sangan Kwon, Yongin-si (KR); Soon-Dong Kim, Yongin-si (KR); Taehoon Kim, Yongin-si (KR); Geunjeong Park, Yongin-si (KR); Changnoh Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/536,707

(22) Filed: Dec. 12, 2023

(65) Prior Publication Data

US 2024/0290235 A1 Aug. 29, 2024

(30) Foreign Application Priority Data

Feb. 24, 2023 (KR) ........................ 10-2023-0025071

(51) Int. Cl.

*G09G 3/00* (2006.01)
*G09G 3/32* (2016.01)

(52) U.S. Cl.

CPC ............... *G09G 3/035* (2020.08); *G09G 3/32* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2320/0271* (2013.01); *G09G 2330/021* (2013.01)

(58) Field of Classification Search

CPC .. G09G 3/035; G09G 3/32; G09G 2300/0819; G09G 2300/0842; G09G 2300/0861; G09G 2310/08; G09G 2320/0233; G09G 2320/0271; G09G 2330/021; G06F 3/04886

USPC .......................................................... 345/212

See application file for complete search history.

(56) References Cited

U.S. PATENT DOCUMENTS

| | | | | |
|---|---|---|---|---|
| 2008/0284929 | A1* | 11/2008 | Kimura | G02F 1/136286 349/48 |
| 2020/0357362 | A1* | 11/2020 | Shin | G09G 3/3233 |
| 2020/0394958 | A1* | 12/2020 | Takahara | H10D 86/0221 |
| 2020/0394984 | A1* | 12/2020 | Park | G09G 5/373 |
| 2021/0027683 | A1* | 1/2021 | Seo | G09G 3/3266 |
| 2021/0201813 | A1* | 7/2021 | Oh | G09G 3/3266 |

FOREIGN PATENT DOCUMENTS

| | | | | |
|---|---|---|---|---|
| CN | 112086022 A * | 12/2020 | | G01B 7/30 |
| KR | 100923347 B1 | 10/2009 | | |

* cited by examiner

*Primary Examiner* — Kwin Xie

(74) *Attorney, Agent, or Firm* — CANTOR COLBURN LLP

(57) ABSTRACT

A display device includes a display panel including pixels, and a panel driver which drive the display panel. Each frame period for the display panel includes N emission cycles, where N is an integer greater than 1. In a partial driving mode, the panel driver sets a black region of the display panel from a M/N point of the display panel along a direction perpendicular to an emission signal line, where M is an integer greater than 0 and less than N, and drives the display panel to display an image corresponding to input image data in a remaining region of the display panel other than the black region and to display a black image in the black region.

20 Claims, 17 Drawing Sheets

DISPLAY DEVICE, AND METHOD OF OPERATING A DISPLAY DEVICE

This application claims priority to Korean Patent Application No. 10-2023-0025071, filed on Feb. 24, 2023, and all the benefits accruing therefrom under 35 U.S.C. § 119, the content of which in its entirety is herein incorporated by reference.

BACKGROUND

1. Field

Embodiments of the invention relate to a display device, and more particularly to a display device that displays a black image in a partial region in a partial driving mode, and a method of operating the display device.

2. Description of the Related Art

A flexible display device, such as a foldable display device or a rollable display device having a flexible display panel, at least a portion of which is deformable (e.g., foldable or bendable), has been developed. In the flexible display device, the flexible display panel may be deformed by a user.

When the flexible display panel is deformed such that that a portion of the flexible display panel is not viewed by a user, the flexible display device may operate in a partial driving mode in which a black image is displayed in the unviewed portion, thereby reducing power consumption.

SUMMARY

When a flexible display device operates in a partial driving mode, the number of pixel rows that emit light may vary over time such that a drop amount of a power supply voltage applied to the flexible display panel may vary over time. Accordingly, the flexible display panel may not emit light with uniform luminance.

Some embodiments provide a display device capable of displaying an image with uniform luminance in a partial driving mode.

Some embodiments provide a method of operating a display device capable of displaying an image with uniform luminance in a partial driving mode.

According to embodiments, a display device includes a display panel including pixels, and a panel driver which drive the display panel. In such embodiments, each frame period for the display panel includes N emission cycles, where N is an integer greater than 1. In such embodiments, in a partial driving mode, the panel driver sets a black region of the display panel from a M/N point of the display panel along a direction perpendicular to an emission signal line, where M is an integer greater than 0 and less than N, and drives the display panel to display an image corresponding to input image data in a remaining region of the display panel other than the black region and to display a black image in the black region.

In embodiments, in the partial driving mode, the panel driver may provide data voltages corresponding to the input image data to the pixels located in the remaining region of the display panel, and may provide black data voltages to the pixels located in the black region of the display panel.

In embodiments, in a normal driving mode, the panel driver may drive the display panel to display an image corresponding to the input image data in an entire region of the display panel.

In embodiments, in the normal driving mode, the panel driver may provide data voltages corresponding to the input image data to all of the pixels of the display panel.

In embodiments, N may be 2, M may be 1, and, in the partial driving mode, the panel driver may set an upper half region or a lower half region of the display panel as the black region.

In embodiments, the display panel may be a foldable display panel which is foldable at a folding line, and the display device may operate in the partial driving mode when the foldable display panel is folded.

In embodiments, a boundary line of the black region corresponding to the M/N point of the foldable display panel may correspond to the folding line of the foldable display panel.

In embodiments, N may be 4, M may be 1, 2 or 3, and, in the partial driving mode, the panel driver may set a 1/4 region, a 2/4 region or a 3/4 region of the display panel as the black region.

In embodiments, the display panel may be a multi-foldable display panel which is foldable at a first folding line, a second folding line and a third folding line, and the display device may operate in the partial driving mode when the multi-foldable display panel is folded.

In embodiments, the first folding line may be located at a 3/4 point from a top edge of the multi-foldable display panel along the direction perpendicular to the emission signal line, the second folding line may be located at a 2/4 point from the top edge of the multi-foldable display panel along the direction perpendicular to the emission signal line, and the third folding line may be located at a ¼ point from the top edge of the multi-foldable display panel along the direction perpendicular to the emission signal line.

In embodiments, when the multi-foldable display panel is folded at the first folding line, the panel driver may set a 1/4 region of the multi-foldable display panel as the black region. When the multi-foldable display panel is folded at the second folding line, the panel driver may set a 2/4 region of the multi-foldable display panel as the black region. When the multi-foldable display panel is folded at the third folding line, the panel driver may set a 3/4 region of the multi-foldable display panel as the black region.

According to embodiments, a method of operating a display device may include providing an emission signal to a display panel at a frequency, which is N times a frame frequency, such that each frame period for the display panel includes N emission cycles, where N is an integer greater than 1. In such embodiments, the method further includes in a partial driving mode, setting a black region of the display panel from a M/N point of the display panel along a direction perpendicular to an emission signal line, where M is an integer greater than 0 and less than N. In such embodiments, the method further includes in the partial driving mode, driving the display panel to display an image corresponding to input image data in a remaining region of the display panel other than the black region and to display a black image in the black region.

In embodiments, the driving the display panel in the partial driving mode may include providing data voltages corresponding to the input image data to pixels located in the remaining region of the display panel, and providing black data voltages to pixels located in the black region of the display panel.

In embodiments, the method may further include in a normal driving mode, driving the display panel to display an image corresponding to the input image data in an entire region of the display panel.

In embodiments, the driving the display panel in the normal driving mode may include providing data voltages corresponding to the input image data to all of pixels of the display panel.

In embodiments, N may be 2, M may be 1, and an upper half region or a lower half region of the display panel may be set as the black region.

In embodiments, the display panel may be a foldable display panel which is foldable at a folding line, and the display device may operate in the partial driving mode when the foldable display panel is folded.

In embodiments, a boundary line of the black region corresponding to the M/N point of the foldable display panel may correspond to the folding line of the foldable display panel.

In embodiments, N may be 4, M may be 1, 2 or 3, and a 1/4 region, a 2/4 region or a 3/4 region of the display panel may be set as the black region.

In embodiments, the display panel may be a multi-foldable display panel which is foldable at a first folding line, a second folding line and a third folding line. In such embodiments, the first folding line may be located at a ¾ point from a top edge of the multi-foldable display panel along the direction perpendicular to the emission signal line, the second folding line may be located at a 2/4 point from the top edge of the multi-foldable display panel along the direction perpendicular to the emission signal line, and the third folding line may be located at a ¼ point from the top edge of the multi-foldable display panel along the direction perpendicular to the emission signal line. In such an embodiment, the setting the black region of the display panel may include, setting a 1/4 region of the multi-foldable display panel as the black region when the multi-foldable display panel is folded at the first folding line, setting a 2/4 of the multi-foldable display panel as the black region when the multi-foldable display panel is folded at the second folding line, and setting a 3/4 region of the multi-foldable display panel as the black region when the multi-foldable display panel is folded at the third folding line.

As described above, in a display device and a method of operating the display device according to embodiments, each frame period may include N emission cycles, where N is an integer greater than 1. In such embodiments, in a partial driving mode, a black region of a display panel may be set from a M/N point of the display panel along a direction perpendicular to an emission signal line, where M is an integer greater than 0 and less than N, an image corresponding to input image data may be displayed in a remaining region of the display panel other than the black region, and a black image may be displayed in the black region. Accordingly, in the partial driving mode, the number of pixel rows emitting light may be substantially constant over time, a power supply voltage applied to the display panel may be substantially constant, and thus the display panel may emit light with uniform luminance.

BRIEF DESCRIPTION OF THE DRAWINGS

Illustrative, non-limiting embodiments will be more clearly understood from the following detailed description in conjunction with the accompanying drawings.

FIG. 1C is a diagram for describing a drop amount of a power supply voltage over time while a foldable display panel is folded at a third folding line.

DETAILED DESCRIPTION

Figure 1:
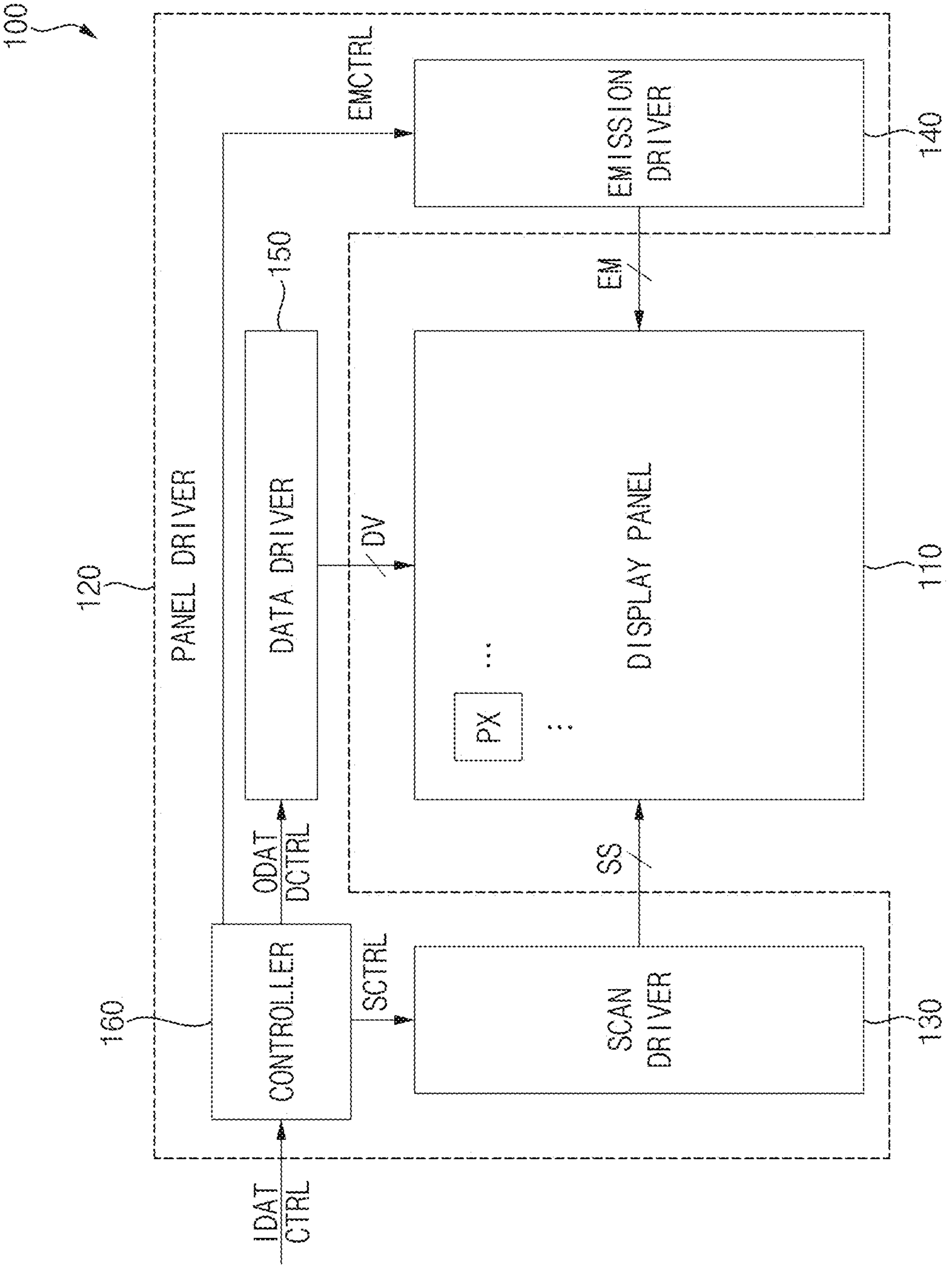
FIG. 1 is a block diagram illustrating a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms.

These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings. The same reference numerals are used for the same components in the drawings, and any repetitive detailed descriptions of the same components may be omitted or simplified.

Figure 2:
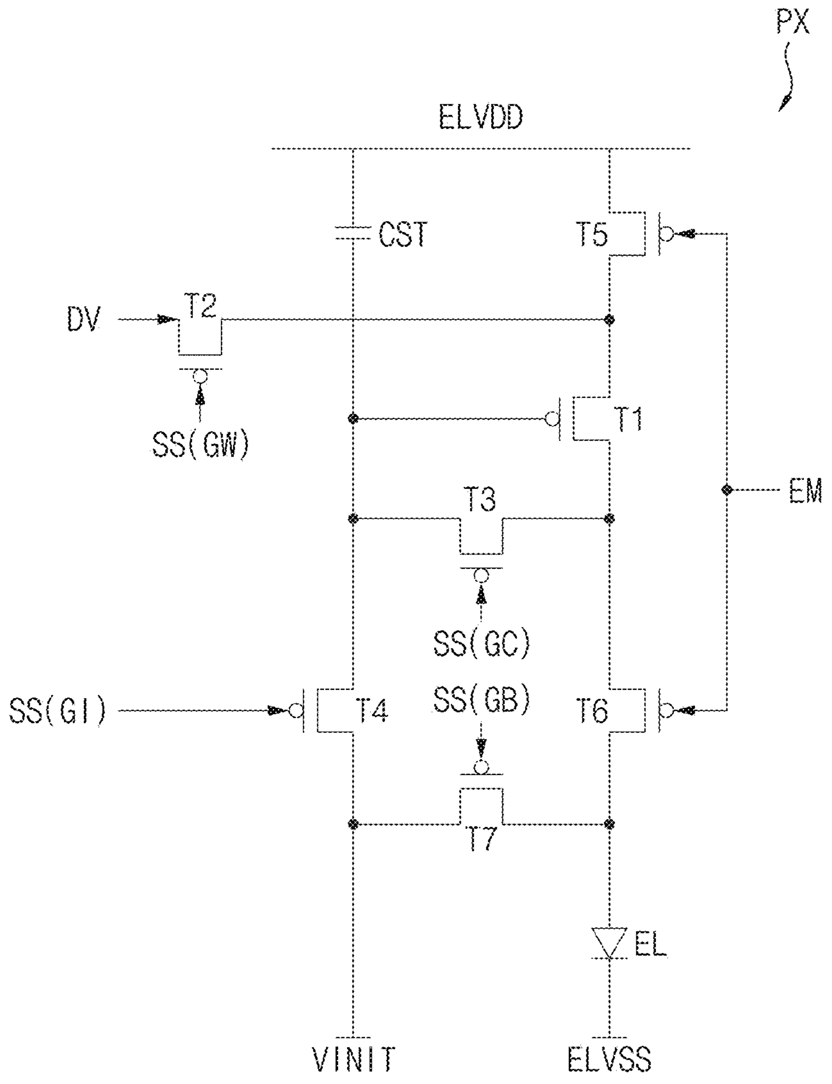
FIG. 2 is a circuit diagram illustrating an example of a pixel included in a display device according to embodiments.
Figure 3A:
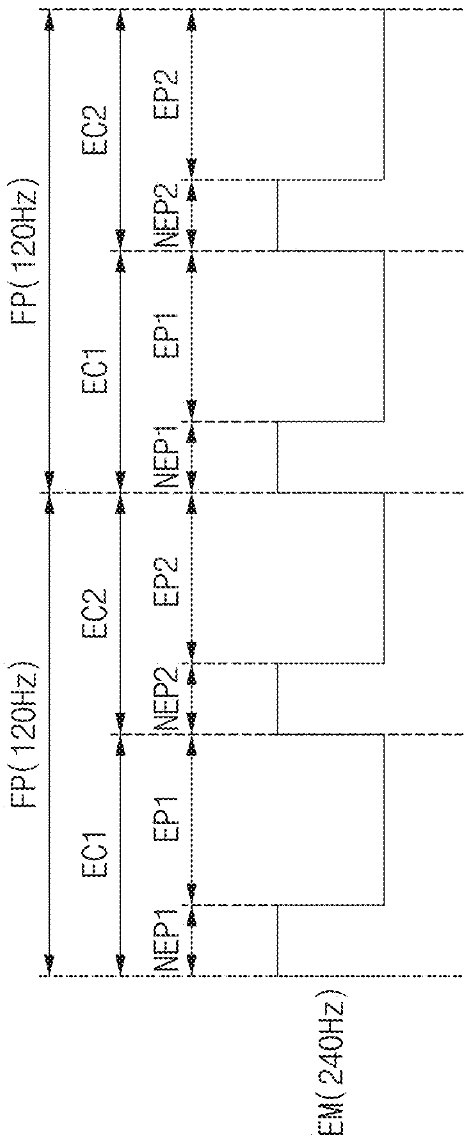
FIG. 3A is a timing diagram illustrating an example of an emission signal applied to each pixel in each frame period.
Figure 3B:
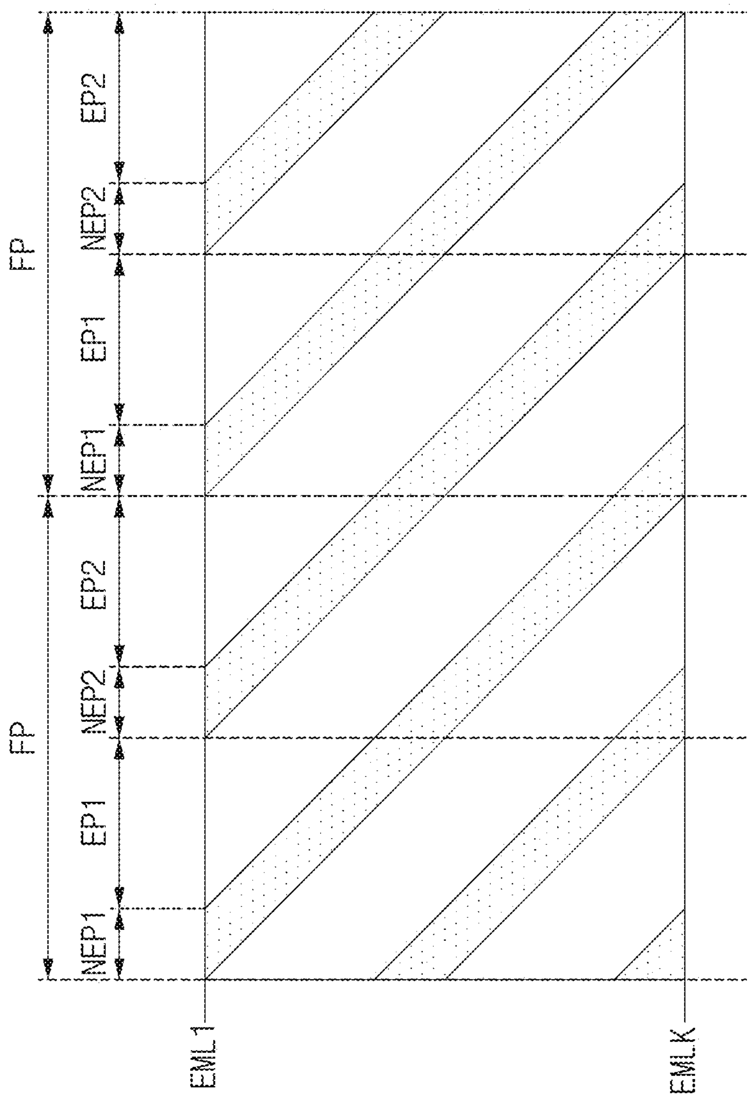
FIG. 3B is a timing diagram for describing a light emitting state of a display panel in each frame period.
Figure 4:
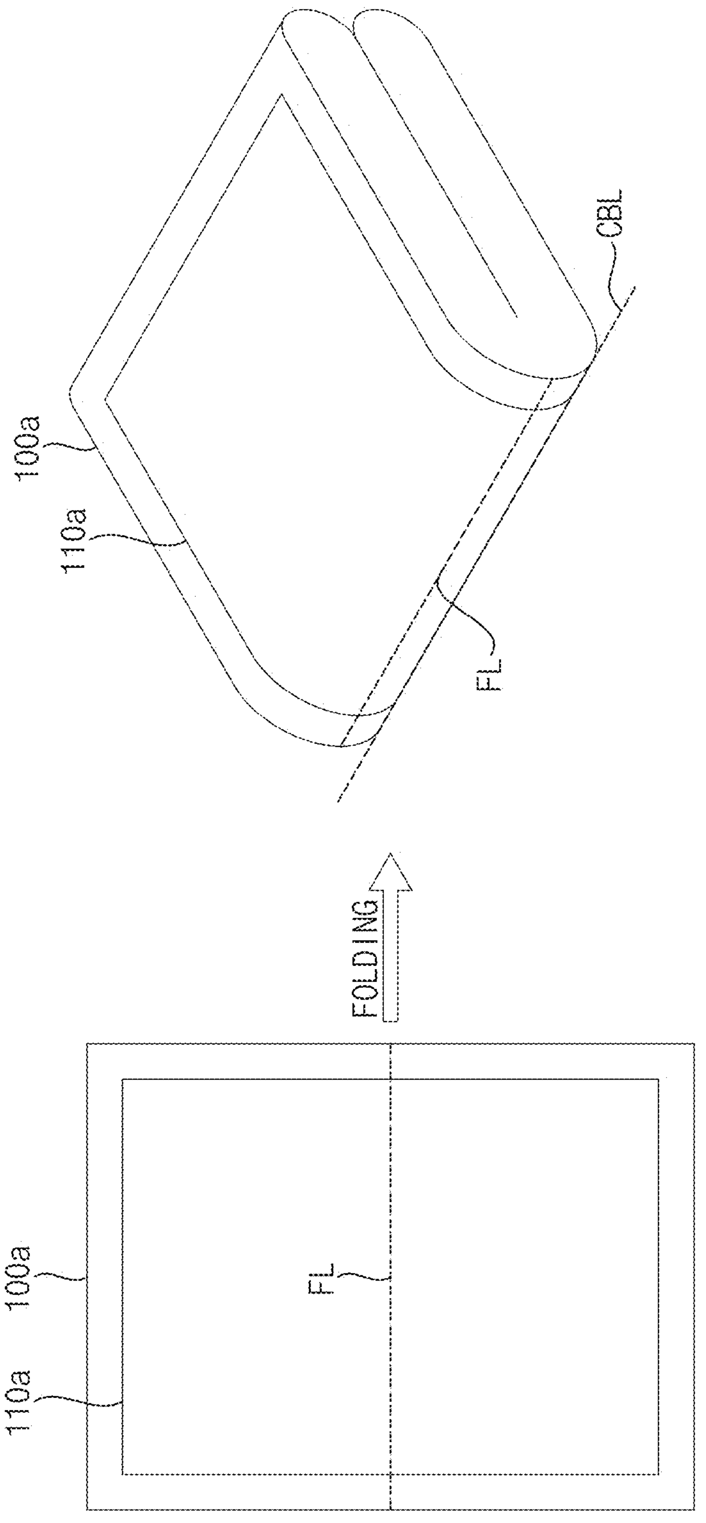
FIG. 4 is a diagram illustrating an example of a foldable display device according to embodiments.
Figure 5:
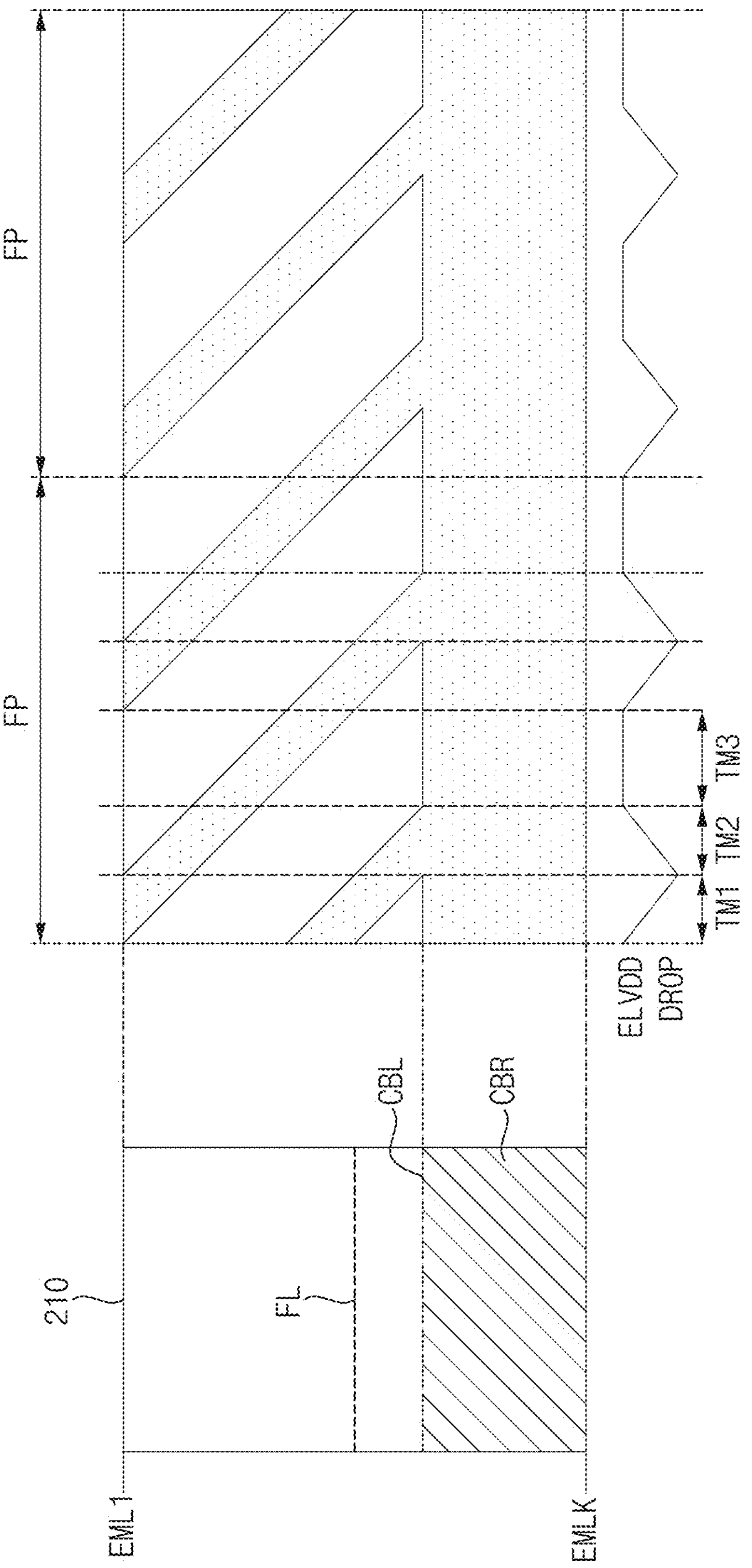
FIG. 5 is a diagram for describing a drop amount of a power supply voltage over time while a conventional foldable display device operates in a partial driving mode.
Figure 6A:
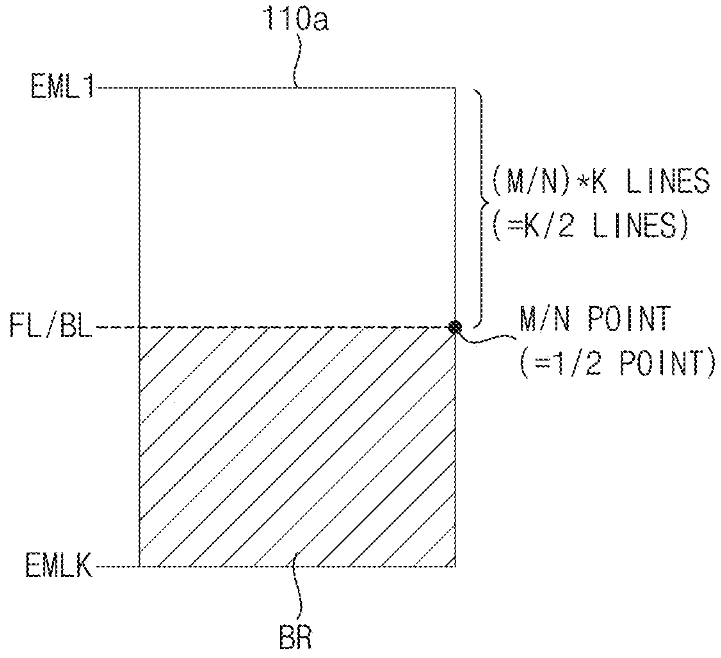
FIG. 6A is a diagram for describing an example where a black region is set in a foldable display device according to embodiments.
Figure 6B:
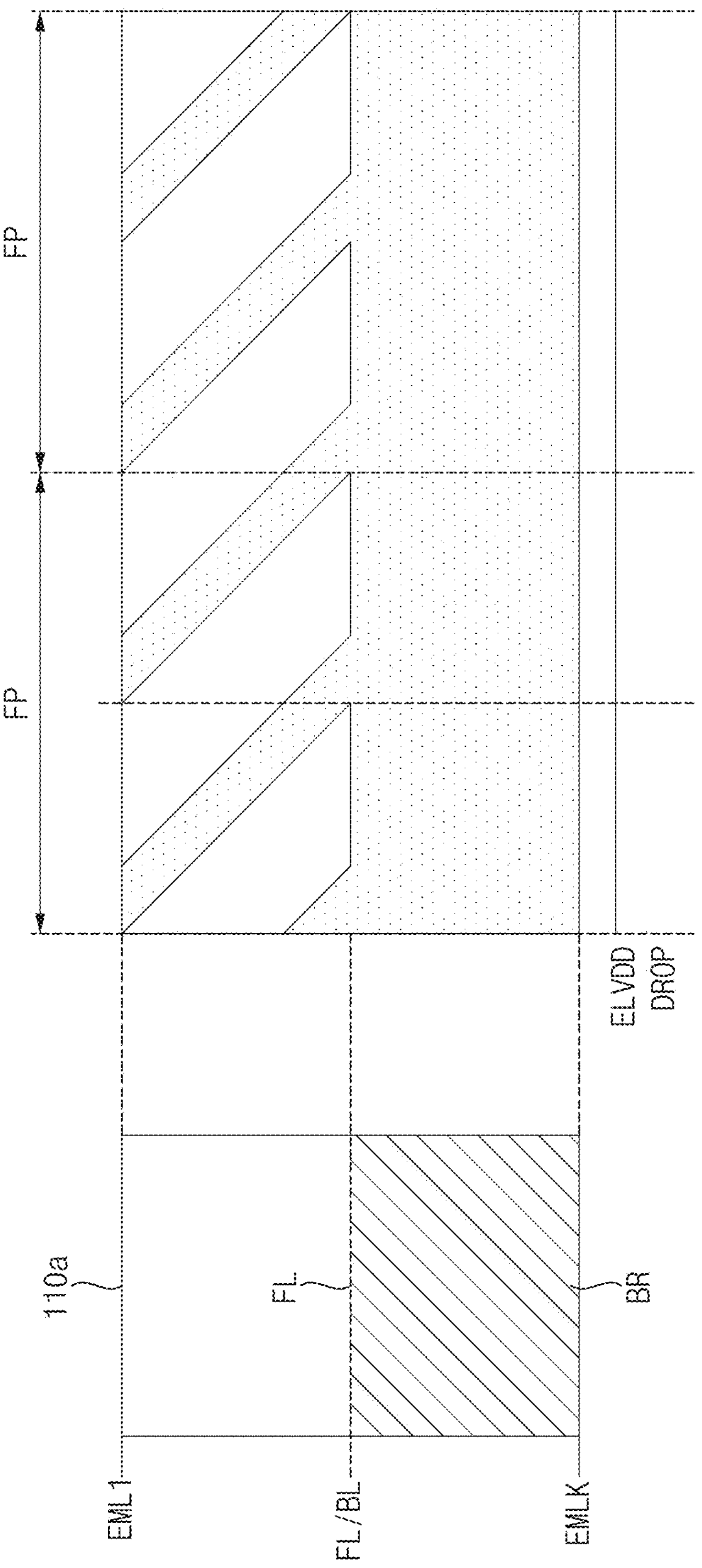
FIG. 6B is a diagram for describing a drop amount of a power supply voltage over time while a foldable display device according to embodiments operates in a partial driving mode.

FIG. 1 is a block diagram illustrating a display device according to embodiments, FIG. 2 is a circuit diagram illustrating an example of a pixel included in a display device according to embodiments, FIG. 3A is a timing diagram illustrating an example of an emission signal applied to each pixel in each frame period, FIG. 3B is a timing diagram for describing a light emitting state of a display panel in each frame period, FIG. 4 is a diagram illustrating an example of a foldable display device according to embodiments, FIG. 5 is a diagram for describing a drop amount of a power supply voltage over time while a conventional foldable display device operates in a partial driving mode, FIG. 6A is a diagram for describing an example where a black region is set in a foldable display device according to embodiments, and FIG. 6B is a diagram for describing a drop amount of a power supply voltage over time while a foldable display device according to embodiments operates in a partial driving mode.

Referring to FIG. 1, a display device 100 according to embodiments may include a display panel 110 that includes a plurality of pixels PX, and a panel driver 120 that drives the display panel 110. In some embodiments, the panel driver 120 may include a scan driver 130 that provides scan signals SS to the plurality of pixels PX, an emission driver 140 that provides emission signals EM to the plurality of pixels PX, a data driver 150 that provides data voltages DV to the plurality of pixels PX, and a controller 160 that controls the scan driver 130, the emission driver 140 and the data driver 150.

The display panel 110 may include a plurality of data lines, a plurality of scan lines, a plurality of emission signal lines, and the plurality of pixels PX connected thereto. Each pixel PX may emit light in response to the emission signal EM transmitted through a corresponding emission signal line connected thereto.

In some embodiments, as illustrated in FIG. 2, each pixel PX may have a 7T1C structure including seven transistors T1, T2, T3, T4, T5, T6 and T7 and one capacitor CST. In an embodiment, for example, each pixel PX may include a storage capacitor CST that stores the data voltage DV that is transferred through a second transistor T2 and a first transistor T1 (that is diode-connected), the first transistor T1 that generates a driving current based on the data voltage DV stored in the storage capacitor CST, a second transistor T2 that transfers the data voltage DV to one end of the first transistor T1 in response to the scan signal SS (e.g., a writing signal GW), a third transistor T3 that diode-connects the first transistor T1 in response to the scan signal SS (e.g., a compensation signal GC), a fourth transistor T4 that applies an initialization voltage VINIT to the storage capacitor CST and a gate of the first transistor T1 in response to the scan signal SS (e.g., an initialization signal GI), a fifth transistor T5 that connects a first power supply voltage ELVDD (e.g., a high power supply voltage) line and the first transistor T1 in response to the emission signal EM, a sixth transistor T6 that connects the first transistor T1 and a light emitting element EL in response to the emission signal EM, a seventh transistor T7 that applies the initialization voltage VINIT to the light emitting element EL in response to the scan signal SS (e.g., a bypass signal GB), and the light emitting element EL connected between the seventh transistor T7 and a second power supply voltage ELVSS (e.g., a low power supply voltage) line. In some embodiments, the scan signals SS applied to the second, third, fourth and seventh transistors T2, T3, T4 and T7 may be different signals, respectively. In alternative embodiments, at least two of the scan signals SS applied to the second, third, fourth and seventh transistors T2, T3, T4 and T7 may be a same signal as each other. Further, in some embodiments, as illustrated in FIG. 2, the initialization voltage VINT transferred through the fourth transistor T4 and the initialization voltage VINT transferred through the seventh transistor T7 may be a same voltage as each other. In alternative embodiments, the initialization voltage VINT transferred through the seventh transistor T7 may be different from the initialization voltage VINT transferred through the fourth transistor T4. Further, although FIG. 2 illustrates an embodiment in which each pixel PX has the 7T1C structure, the structure of the pixel PX of the display device 100 according to embodiments is not limited to the 7T1C structure illustrated in FIG. 2.

The scan driver 130 may generate the scan signals SS based on a scan control signal SCTRL received from the controller 160, and may provide the scan signals SS to the plurality of pixels PX. In some embodiments, the scan driver 130 may sequentially provide the scan signals SS to the plurality of pixels PX on a row-by-row basis. Further, in some embodiments, the scan control signal SCTRL may include a scan start signal and a scan clock signal, but is not limited thereto. In some embodiments, the scan driver 130 may be integrated or formed in a peripheral portion of the display panel 110. In alternative embodiments, the scan driver 130 may be implemented as one or more integrated circuits.

The emission driver 140 may provide the emission signals EM to the plurality of pixels PX through the plurality of emission signal lines based on an emission control signal EMCTRL received from the controller 160. In some embodiments, the emission driver 140 may sequentially provide the emission signals EM to the plurality of pixels PX on a row-by-row basis such that the plurality of pixels PX sequentially emits light on the row-by-row basis. In some embodiments, the emission driver 140 may be integrated or formed on the peripheral portion of the display panel 110. In other embodiments, the emission driver 140 may be implemented with one or more integrated circuits.

In the display device 100 according to embodiments, the emission driver 140 may provide the emission signal EM to the display panel 110 at a frequency that is N times a frame frequency such that each frame period includes N emission cycles, where N is an integer greater than 1. In an embodiment, for example, as illustrated in FIG. 3A, the emission driver 140 may provide the emission signal EM to each pixel PX at a frequency (e.g., about 240 Hz) that is two times a frame frequency (e.g., about 120 Hz) such that each frame period FP includes two emission cycles EC1 and EC2. That is, each frame period FP may include a first emission cycle EC1 having a first off period of the emission signal EM (or a first non-emission period NEP1) and a first on period of the emission signal EM (or a first emission period EP1), and a second emission cycle EC2 having a second off period of the emission signal EM (or a second non-emission period NEP2) and a second on period of the emission signal EM (or a second emission period EP2). In such an embodiment, in each frame period FP, each pixel PX may not emit light in the first off period of the emission signal EM, or the first non-emission period NEP1, may emit light in the first on period of the emission signal EM, or the first emission period EP1, may not emit light in the second off period of the emission signal EM, or the second non-emission period NEP2, and may emit light in the second on period of the emission signal EM, or the second emission period EP2.

In an embodiment, the emission driver 140 may sequentially provide the emission signal EM illustrated in FIG. 3A to the display panel 110 on a row-by-row basis by shifting the emission signal EM by a predetermined time (e.g., one horizontal time). In an embodiment, for example, as illustrated in FIG. 3B, in a case where the display panel 110 includes K pixel rows, where K is an integer greater than 1, the emission driver 140 may sequentially provide the emission signal EM from a first emission signal line EML1 to a K-th emission signal line EMLK on a pixel row basis or on an emission signal line basis. Accordingly, after the predetermined time from when a first pixel row connected to the first emission signal line EML1 emits light, a second pixel row connected to a second emission signal line emits light, and, after the predetermined time from when the second pixel row connected to the second emission signal line emits light, a third pixel row connected to a third emission signal line emits light. In this manner, the K pixel rows may sequentially emit light in an order from the first pixel row connected to the first emission signal line EML1 to a K-th pixel row connected to the K-th emission signal line EMLK. Further, each pixel row may repeatedly not emit and emit light in the non-emission periods NEP1 and NEP2 and the emission periods EP1 and EP2 of each frame period FP.

Referring back to FIG. 1, the data driver 150 may receive output image data ODAT and a data control signal DCTRL from the controller 160, and may provide the data voltages DV to the plurality of pixels PX based on the output image data ODAT and the data control signal DCTRL. In some embodiments, the data control signal DCTRL may include an output data enable signal, a horizontal start signal and a load signal, but is not limited thereto. In some embodiments, the data driver 150 and the controller 160 may be implemented as a single integrated circuit, and the single integrated circuit may be referred to as a timing controller embedded data driver (TED) integrated circuit. In alternative embodiments, the data driver 150 and the controller 160 may be implemented as separate integrated circuits.

The controller 160 (e.g., a timing controller) may receive input image data IDAT and a control signal CTRL from an outside or an external host processor (e.g., a graphics processing unit (GPU), an application processor (AP) or a graphics card). In some embodiments, the input image data IDAT may be RGB image data including red image data, green image data and blue image data. Further, in some embodiments, the control signal CTRL may include a vertical synchronization signal, a horizontal synchronization signal, an input data enable signal, a master clock signal, etc., but is not limited thereto. The controller 160 may generate the output image data ODAT, the data control signal DCTRL, the emission control signal EMCTRL and the scan control signal SCTRL based on the input image data IDAT and the control signal CTRL. The controller 160 may control an operation of the scan driver 130 by providing the scan control signal SCTRL to the scan driver 130, may control an operation of the emission driver 140 by providing the emission control signal EMCTRL to the emission driver 140, and may control an operation of the data driver 150 by providing the output image data ODAT and the data control signal DCTRL to the data driver 150.

In some embodiments, as illustrated in FIG. 4, the display device 100 may be a foldable display device 100*a* that includes a foldable display panel 110*a*. In an embodiment, for example, the foldable display device 100*a* may be an out-foldable display device in which the foldable display panel 110*a* is folded at a folding line FL such that a partial display region of the foldable display panel 110*a* is positioned on a front side and the remaining display region is positioned on a rear side. When the foldable display panel 110*a* is folded, at least a portion of a display region of the foldable display panel 110*a* may not be viewed by a user. The foldable display device 100*a* according to embodiments may operate in a normal driving mode in which an image corresponding to the input image data IDAT is displayed in the entire display region of the foldable display panel 110*a* when the foldable display panel 110*a* is not folded. In such embodiments, when the foldable display panel 110*a* is folded, the foldable display device 100*a* may operate in a partial driving mode in which a black image is displayed in the portion of the display region of the foldable display panel 110*a* that is not viewed. In an embodiment, for example, an external sensor (e.g., an angle sensor) may detect whether the foldable display panel 110*a* is folded, the external host processor may provide the controller 160 of the panel driver 120 with a mode signal representing the normal driving mode or the partial driving mode based on a detected result of whether the foldable display panel 110*a* is folded, and the panel driver 120 may drive the foldable display panel 110*a* in the normal driving mode or the partial driving mode in response to the mode signal. In an alternative embodiment, for example, the panel driver 120 includes a sensor (e.g., the angle sensor) that detects whether the foldable display panel 110*a* is folded, and may drive the foldable display panel 110*a* in the normal driving mode or the partial driving mode based on a detected result of whether the foldable display panel 110*a* is folded. Accordingly, the foldable display device 100*a* according to embodiments may reduce power consumption in the partial driving mode.

When the foldable display panel 110*a* is folded at the folding line FL, not only a upper half region of the foldable display panel 110*a* positioned above the folding line FL, but also a portion of a lower half region of the foldable display panel 110*a* positioned below the folding line FL may be viewed by the user. Thus, in a conventional foldable display device, as illustrated in FIGS. 4 and 5, when a foldable display panel 210 is folded at a folding line FL, a partial region CBR of the foldable display panel 210 spaced apart from the folding line FL by a predetermined interval may be set to display a black image. That is, a boundary line CBL of the partial region CBR (or a black region CBR) of the foldable display panel 210 which is set to display a black image may be different from the folding line FL. In this case, a power supply voltage ELVDD (e.g., the high power supply voltage) applied to the foldable display panel 210 may vary over time. That is, as illustrated in FIG. 5, during a first time TM1 from a start time point of each frame period FP, the number of pixel rows emitting light in the foldable display panel 210 may be decreased, and thus a drop amount (e.g., a current-resistance (IR) drop amount) of the power supply voltage ELVDD may be decreased. Further, during a second time TM2 after the first time TM1, the number of pixel rows emitting light in the foldable display panel 210 may be increased, and thus the drop amount of the power supply voltage ELVDD may be increased. In addition, the number of pixel rows emitting light in a third time TM3 may be greater than the number of pixel rows emitting light in the first and second times TM1 and TM2. Accordingly, in the conventional foldable display device, since the power supply voltage ELVDD varies over time, the foldable display panel 210 may not emit light with uniform luminance.

In the display device 100 (or the foldable display device 100*a*) according to embodiments, in a case where each frame period FP includes N emission cycles EC1 and EC2, as illustrated in FIG. 6A, in the partial driving mode, the panel driver 120 may set a black region BR of the display panel 110 (or the foldable display panel 110*a*) from a M/N point of the display panel 110 (or the foldable display panel 110*a*) along a direction (e.g., a vertical direction) perpendicular to an emission signal line extending in a horizontal direction, where M is an integer greater than 0 and less than N. In an embodiment, for example, in a case where the foldable display panel 110*a* includes K pixel rows respectively connected to K emission signal lines EML1, . . . , EMLK, and each frame period FP includes two emission cycles EC1 and EC2, the panel driver 120 may set K/2 pixel rows from a top edge (i.e., a top side or a top end) of the foldable display panel 110*a* as a normal region, and may set K/2 pixel rows from the M/N point, or a ½ point of the foldable display panel 110*a* as the black region BR. That is, when N is 2 and M is 1, in the partial driving mode, the panel driver 120 may set a half region (e.g., an upper half region or a lower half region) of the foldable display panel 110*a* as the black region BR. In this case, in some embodiments, a boundary line BL of the black region BR corresponding to the M/N point (e.g., the 1/2 point) of the foldable display panel 110*a* may correspond to (or may be substantially the same as) the folding line FL of the foldable display panel 110*a*.

Further, in the display device 100 (or the foldable display device 100*a*) according to embodiments, the panel driver 120 may drive the display panel 110 (or the foldable display panel 110*a*) to display an image corresponding to the input image data IDAT in the entire region of the display panel 110 (or the foldable display panel 110*a*) in the normal driving mode. In an embodiment, for example, in the normal driving mode, the data driver 150 of the panel driver 120 may provide the data voltages DV corresponding to the input image data IDAT to all of the pixels PX of the display panel 110 (or the foldable display panel 110*a*). However, in the partial driving mode, the panel driver 120 may drive the display panel 110 (or the foldable display panel 110*a*) to display an image corresponding to the input image data IDAT in the normal region and to display a black image in the black region BR. In an embodiment, for example, in the partial driving mode, the data driver 150 of the panel driver 120 may provide the data voltages DV corresponding to the input image data IDAT to the pixels PX located in the normal region of the display panel 110 (or the foldable display panel 110*a*), and may provide black data voltages (e.g., the data voltages DV corresponding to a 0-gray level) to the pixels PX located in the black region BR of the display panel 110 (or the foldable display panel 110*a*).

In such embodiments of the display device 100 (or the foldable display device 100*a*), in the partial driving mode, the number of pixel rows emitting light may be substantially constant over time, and the power supply voltage ELVDD applied to the display panel 110 (or the foldable display panel 110*a*) may have a substantially constant voltage level over time. In an embodiment, for example, as illustrated in FIG. 6B, when the black region BR is set from the ½ point of the foldable display panel 110*a*, the number of non-emitting pixel rows and the number of emitting pixel rows may be substantially constant within each frame period FP, and thus the drop amount of the power source voltage ELVDD may be substantially constant within each frame period FP. Accordingly, the display panel 110 (or the foldable display panel 110*a*) may emit light with uniform luminance in the partial driving mode.

As described above, in the display device 100 according to embodiments, each frame period FP may include N emission cycles EC1 and EC2. Further, in the partial driving mode, the black region BR of the display panel 110 may be set from the M/N point of the display panel 110 along the direction perpendicular to the emission signal line (e.g., the first emission signal line EML1), an image corresponding to the input image data IDAT may be displayed in the normal region, or the remaining region of the display panel 110 other than the black region BR, and the black image may be displayed in the black region BR. Accordingly, in the partial driving mode, the number of pixel rows emitting light may be substantially constant over time, the power supply voltage ELVDD applied to the display panel 110 may be substantially constant, and thus the display panel 110 may emit light with uniform luminance.

Figure 7:
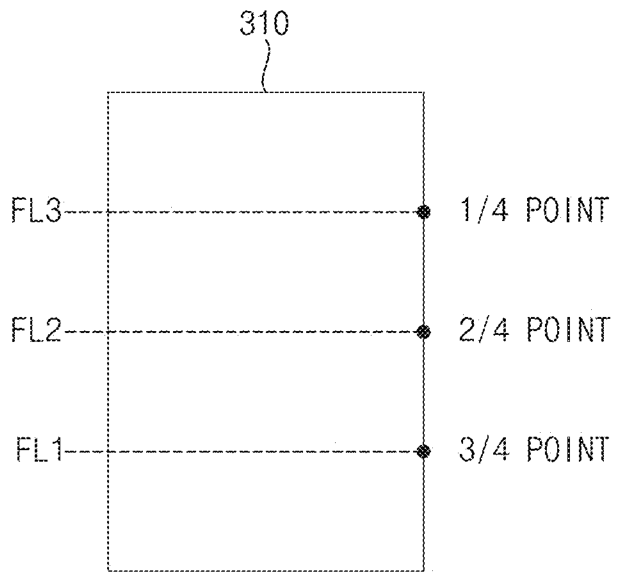
FIG. 7 is a diagram illustrating an example of a foldable display panel of a foldable display device according to embodiments.
Figure 8:
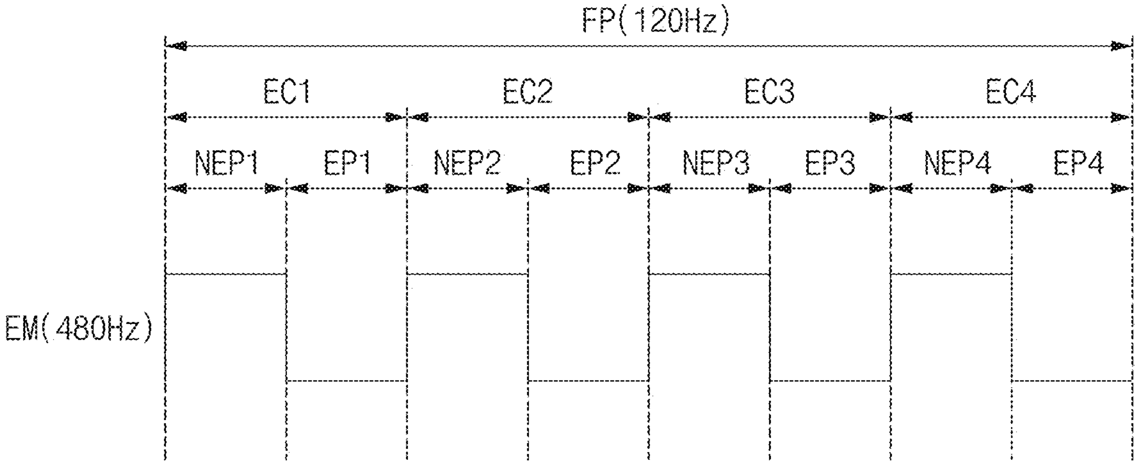
FIG. 8 is a timing diagram illustrating an example of an emission signal applied to each pixel in each frame period in a foldable display device according to embodiments.
Figure 9A:
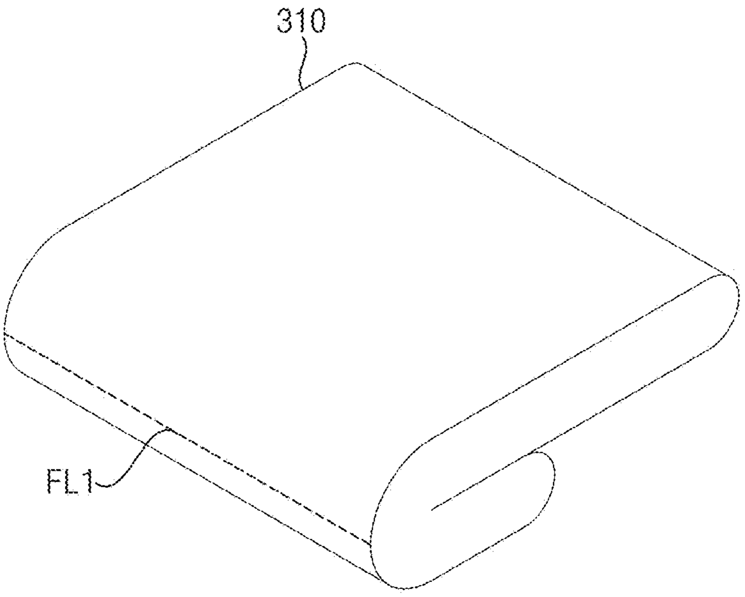
FIG. 9A is a diagram illustrating an example of a foldable display panel that is folded at a first folding line.
Figure 9B:
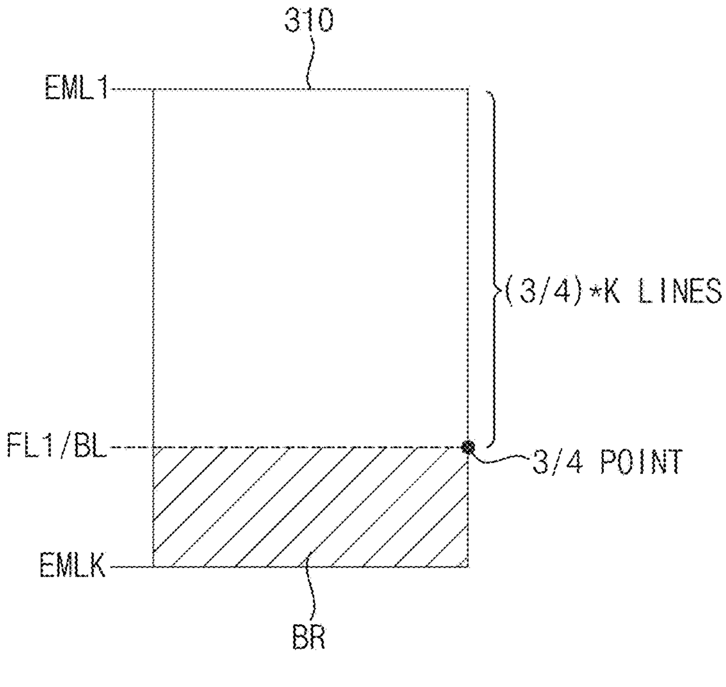
FIG. 9B is a diagram for describing an example where a black region is set when a foldable display panel is folded at a first folding line.
Figure 9C:
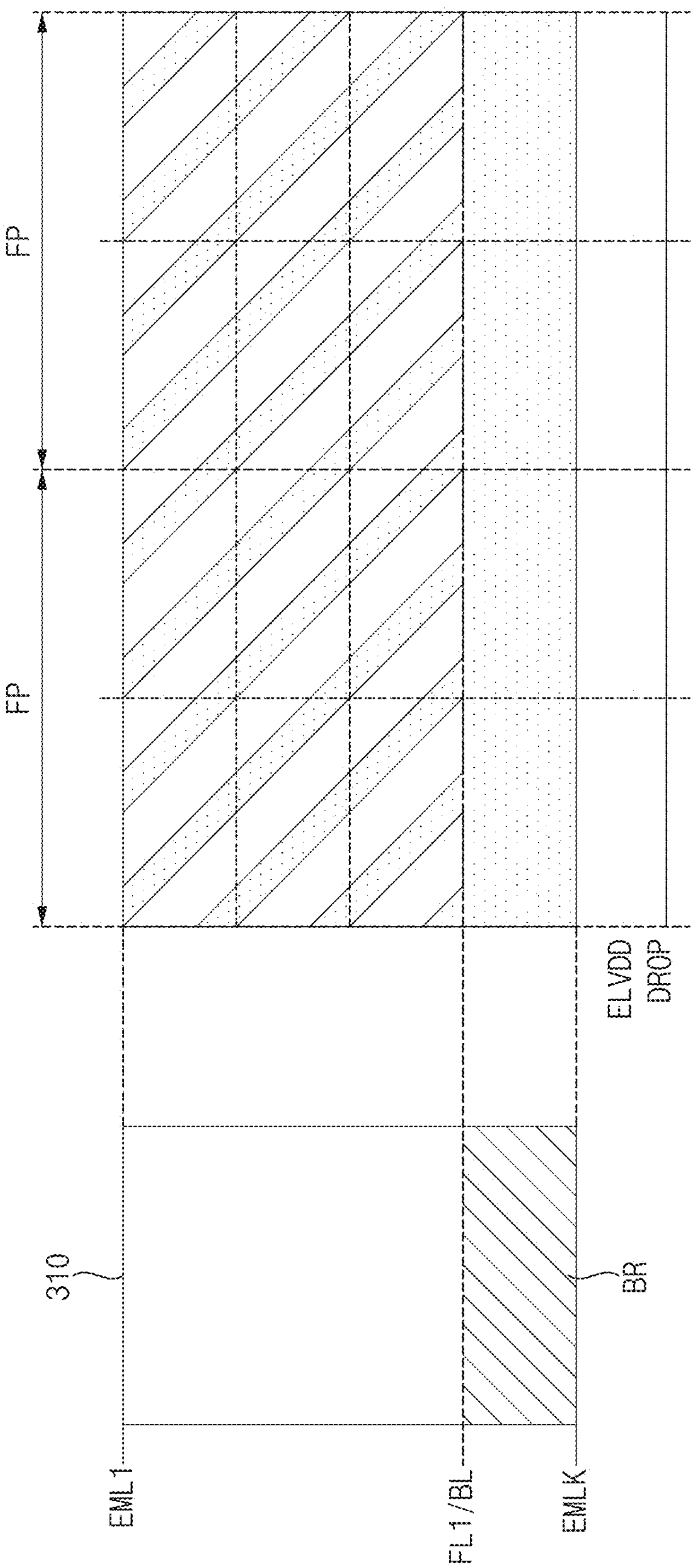
FIG. 9C is a diagram for describing a drop amount of a power supply voltage over time while a foldable display panel is folded at a first folding line.
Figure 10A:
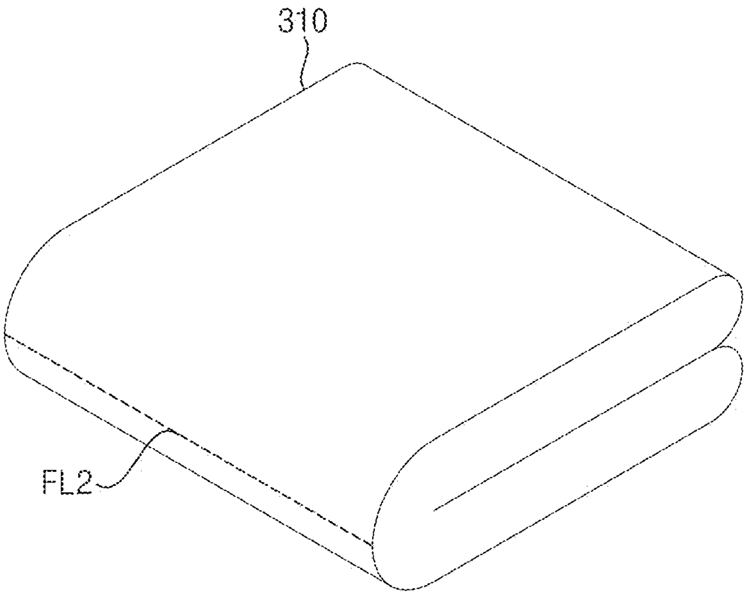
FIG. 10A is a diagram illustrating an example of a foldable display panel that is folded at a second folding line.
Figure 10B:
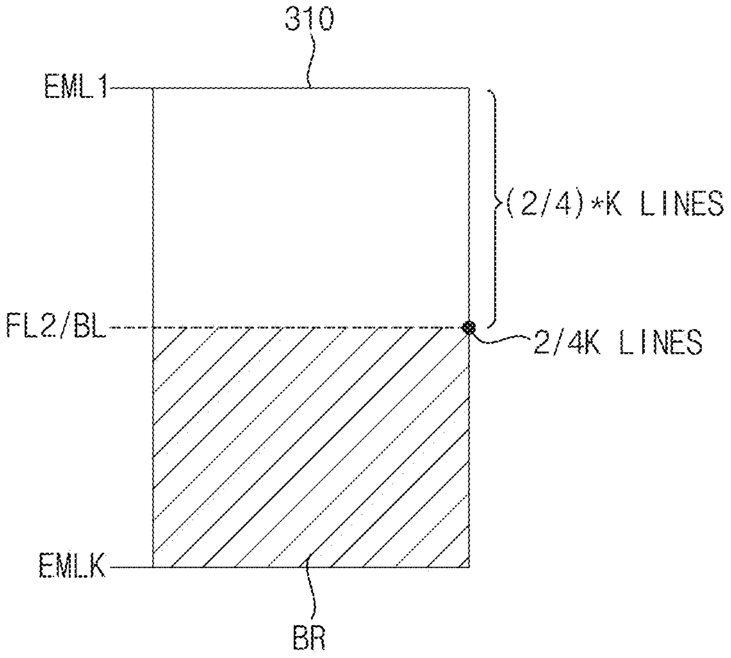
FIG. 10B is a diagram for describing an example where a black region is set when a foldable display panel is folded at a second folding line.
Figure 10C:
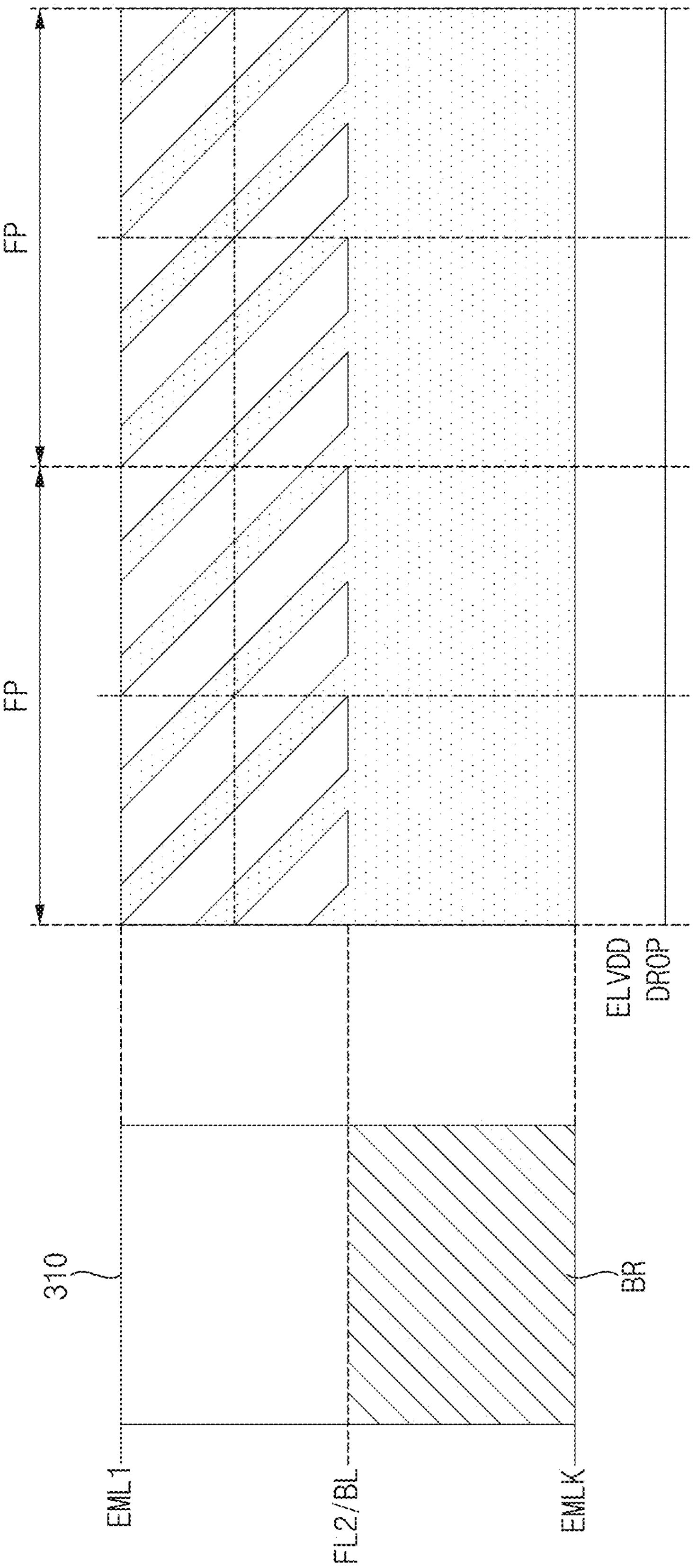
FIG. 10C is a diagram for describing a drop amount of a power supply voltage over time while a foldable display panel is folded at a second folding line.
Figure 11A:
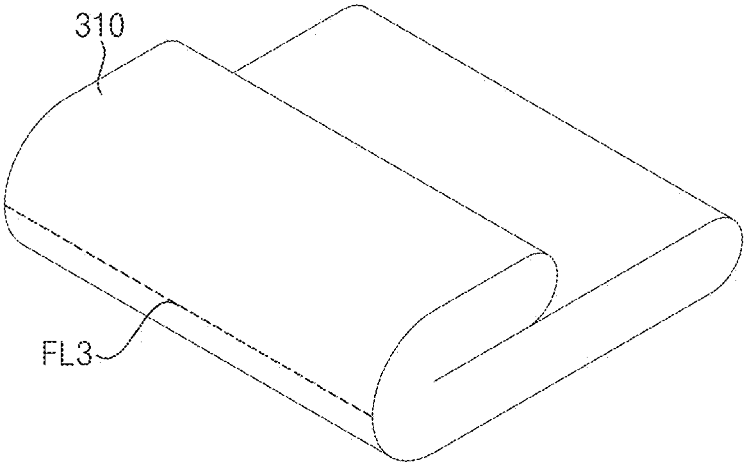
FIG. 11A is a diagram illustrating an example of a foldable display panel that is folded at a third folding line.
Figure 11B:
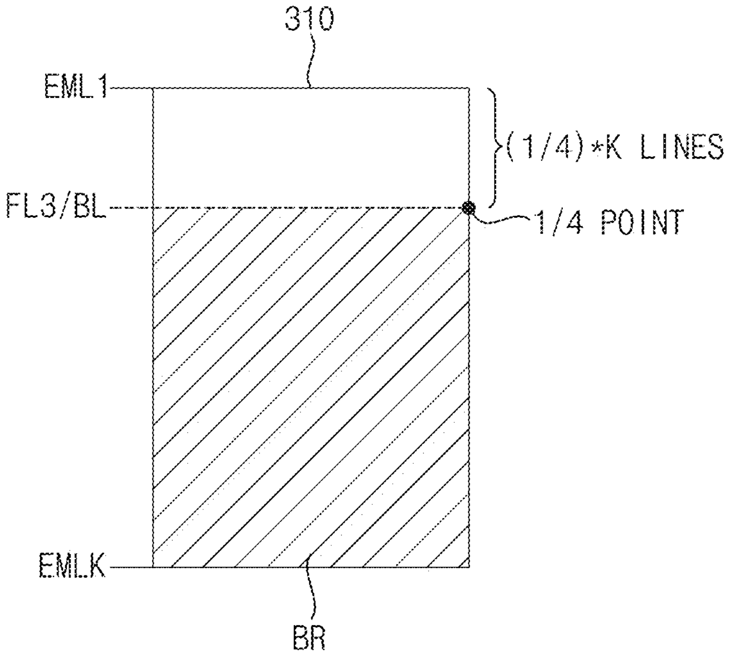
FIG. 11B is a diagram for describing an example where a black region is set when a foldable display panel is folded at a third folding line.

FIG. 7 is a diagram illustrating an example of a foldable display panel of a foldable display device according to embodiments, FIG. 8 is a timing diagram illustrating an example of an emission signal applied to each pixel in each frame period in a foldable display device according to embodiments, FIG. 9A is a diagram illustrating an example of a foldable display panel that is folded at a first folding line, FIG. 9B is a diagram for describing an example where a black region is set when a foldable display panel is folded at a first folding line, FIG. 9C is a diagram for describing a drop amount of a power supply voltage over time while a foldable display panel is folded at a first folding line, FIG. 10A is a diagram illustrating an example of a foldable display panel that is folded at a second folding line, FIG. 10B is a diagram for describing an example where a black region is set when a foldable display panel is folded at a second folding line, FIG. 10C is a diagram for describing a drop amount of a power supply voltage over time while a foldable display panel is folded at a second folding line, FIG. 11A is a diagram illustrating an example of a foldable display panel that is folded at a third folding line, FIG. 11B is a diagram for describing an example where a black region is set when a foldable display panel is folded at a third folding line, and FIG. 1C is a diagram for describing a drop amount of a power supply voltage over time while a foldable display panel is folded at a third folding line.

Referring to FIG. 7, a display device according to embodiments may be a foldable display device including a multi-foldable display panel 310 capable of being folded at a plurality of folding lines FL1, FL2 and FL3. In an embodiment, for example, the multi-foldable display panel 310 may be folded at a first folding line FL1, a second folding line FL2 and a third folding line FL3. Further, the first folding line FL1 may be located at a ¾ point from a top edge of the multi-foldable display panel 310 along a direction (e.g., a vertical direction) perpendicular to an emission signal line, the second folding line FL2 may be located at a 2/4 point from the top edge of the multi-foldable display panel 310 along the direction perpendicular to the emission signal line, and the third folding line may be located at a ¼ point from the top edge of the multi-foldable display panel 310 along the direction perpendicular to the emission signal line. The foldable display device may operate in a normal driving mode when the multi-foldable display panel 310 is not folded, and may operate in a partial driving mode when the multi-foldable display panel 310 is folded.

Further, in such embodiments of the foldable display device, an emission driver may provide an emission signal to the multi-foldable display panel 310 at a frequency that is N times a frame frequency such that each frame period includes N emission cycles, where N is an integer greater than 1. In an embodiment, for example, as illustrated in FIG. 8, the emission driver may provide the emission signal to each pixel at a frequency (e.g., about 480 Hz) that is four times a frame frequency (e.g., about 120 Hz) such that each frame period FP includes four emission cycles EC1, EC2, EC3 and EC4. That is, each frame period FP may include a first emission cycle EC1 having a first off period of the emission signal EM (or a first non-emission period NEP1) and a first on period of the emission signal EM (or a first emission period EP1), a second emission cycle EC2 having a second off period of the emission signal EM (or a second non-emission period NEP2) and a second on period of the emission signal EM (or a second emission period EP2), a third emission cycle EC3 having a third off period of the emission signal EM (or a third non-emission period NEP3) and a third on period of the emission signal EM (or a third emission period EP3), and a fourth emission cycle EC4 having a fourth off period of the emission signal EM (or a fourth non-emission period NEP4) and a fourth on period of the emission signal EM (or a fourth emission period EP4). Further, in each frame period FP, each pixel may not emit light in the first off period of the emission signal EM, or the first non-emission period NEP1, may emit light in the first on period of the emission signal EM, or the first emission period EP1, may not emit light in the second off period of the emission signal EM, or the second non-emission period NEP2, may emit light in the second on period of the emission signal EM, or the second emission period EP2, may not emit light in the third off period of the emission signal EM, or the third non-emission period NEP3, may emit light in the third on period of the emission signal EM, or the third emission period EP3, may not emit light in the fourth off period of the emission signal EM, or the fourth non-emission period NEP4, and may emit light in the fourth on period of the emission signal EM, or the fourth emission period EP4.

In the foldable display device including the multi-foldable display panel 310 according to embodiments, in a case where each frame period FP includes the four emission cycles EC1, EC2, EC3 and EC4. And the multi-foldable display panel 310 has the first folding line FL1, the second folding line FL2 and the third folding line FL3, in a partial driving mode, a panel driver of the foldable display device may set a ¼ region, a 2/4 region or a % region of the multi-foldable display panel 310 as a black region according to a folded position (or a position of the folding line) of the multi-foldable display panel 310.

In an embodiment, for example, when the multi-foldable display panel 310 is folded at the first folding line FL1 positioned at the ¾ point as illustrated in FIG. 9A, the panel driver may set the ¼ region of the multi-foldable display panel 310 as the black region BR as illustrated in FIG. 9B. That is, the panel driver may set (¾)*K (i.e., (¾)×K) pixel rows from a top edge of the multi-foldable display panel 310 as a normal region, and may set (¼)*K pixel rows from the ¾ point as the black region BR. In this case, a boundary line BL of the black region BR may be substantially the same as the first folding line FL1. Further, in the partial driving mode, as illustrated in FIG. 9C, the number of non-emitting pixel rows and the number of emitting pixel rows may be substantially constant within each frame period FP, and thus a drop amount of a power source voltage ELVDD may be substantially constant within each frame period FP. Accordingly, the multi-foldable display panel 310 may emit light with uniform luminance in the partial driving mode.

In such embodiments, when the multi-foldable display panel 310 is folded at the second folding line FL2 positioned at the 2/4 point as illustrated in FIG. 10A, the panel driver may set the 2/4 region of the multi-foldable display panel 310 as the black region BR as illustrated in FIG. 10B. That is, the panel driver may set (2/4)*K pixel rows from the top edge of the multi-foldable display panel 310 as the normal region, and may set (2/4)*K pixel rows from the 2/4 point as the black region BR. In this case, the boundary line BL of the black region BR may be substantially the same as the second folding line FL2. Further, in the partial driving mode, as illustrated in FIG. 10C, the number of non-emitting pixel rows and the number of emitting pixel rows may be substantially constant within each frame period FP, and thus the drop amount of the power source voltage ELVDD may be substantially constant within each frame period FP. Accordingly, the multi-foldable display panel 310 may emit light with uniform luminance in the partial driving mode.

Figure 11C:
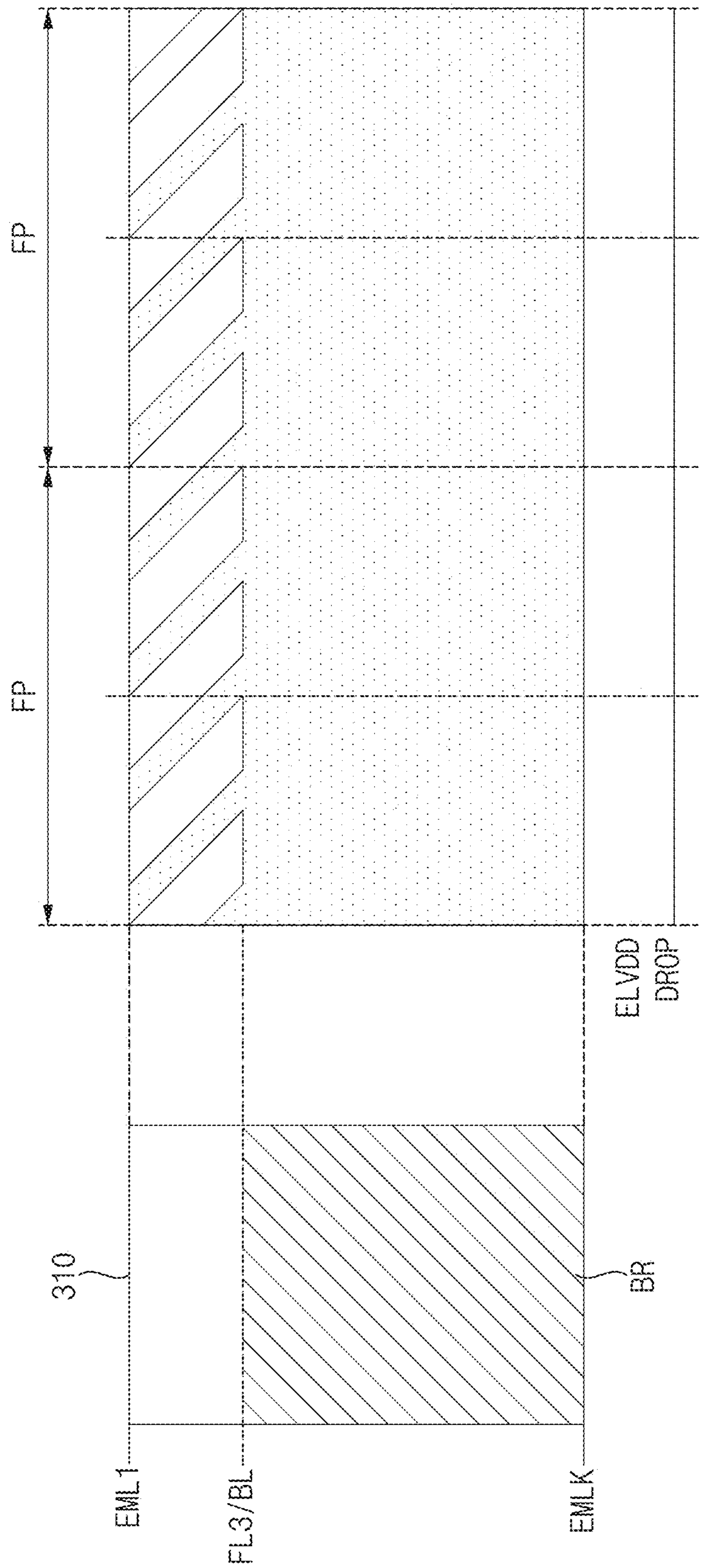

In such embodiments, when the multi-foldable display panel 310 is folded at the third folding line FL3 positioned at the 1/4 point as illustrated in FIG. 11A, the panel driver may set the 1/4 region of the multi-foldable display panel 310 as the black region BR as illustrated in FIG. 11B. That is, the panel driver may set (1/4)*K pixel rows from the top edge of the multi-foldable display panel 310 as the normal region, and may set (3/4)*K pixel rows from the 1/4 point as the black region BR. In this case, the boundary line BL of the black region BR may be substantially the same as the third folding line FL3. Further, in the partial driving mode, as illustrated in FIG. 11C, the number of non-emitting pixel rows and the number of emitting pixel rows may be substantially constant within each frame period FP, and thus the drop amount of the power source voltage ELVDD may be substantially constant within each frame period FP. Accordingly, the multi-foldable display panel 310 may emit light with uniform luminance in the partial driving mode.

Figure 12:
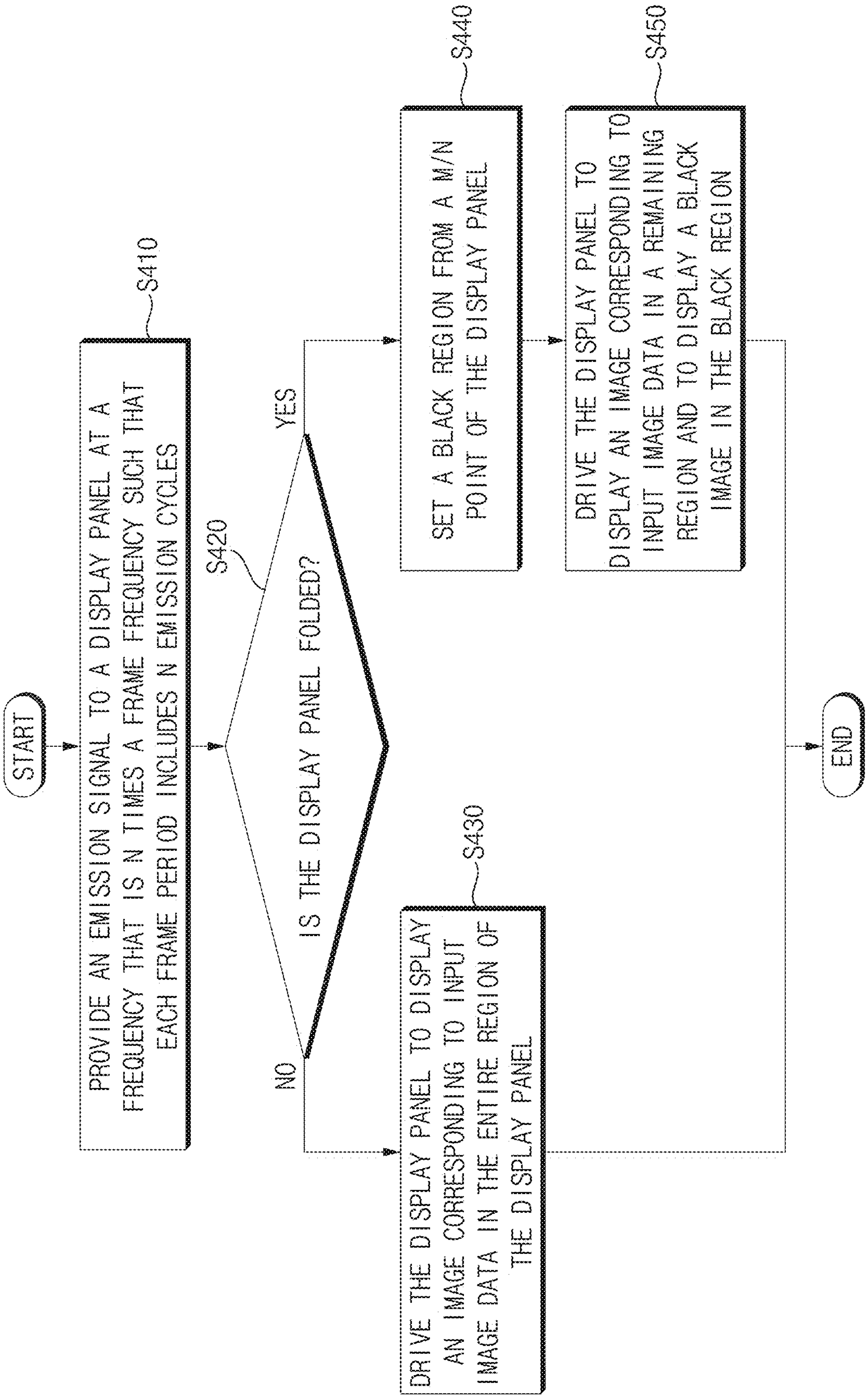
FIG. 12 is a flowchart illustrating a method of operating a display device according to embodiments.

FIG. 12 is a flowchart illustrating a method of operating a display device according to embodiments.

Referring to FIGS. 1 and 12, in a method of operating a display device 100 according to embodiments, an emission driver 140 may provide an emission signal EM to a display panel 110 at a frequency that is N times a frame frequency such that each frame period includes N emission cycles, where N is an integer greater than 1 (S410). Further, a panel driver 120 may drive the display panel 110 in a normal driving mode or a partial driving mode based on whether the display panel 110 is folded (S420 through S450).

When the display panel 110 is not folded (S420: NO), the panel driver 120 may drive the display panel 110 in the normal driving mode. That is, the panel driver 120 may drive the display panel 110 to display an image corresponding to input image data IDAT in the entire region of the display panel 110 (S430). In an embodiment, for example, a data driver 150 of the panel driver 120 may provide data voltages DV corresponding to the input image data IDAT to all of pixels PX of the display panel 110.

When the display panel 110 is folded (S420: YES), the panel driver 120 may drive the display panel 110 in the partial driving mode. In the partial driving mode, the panel driver 120 may set a black region of the display panel from a M/N point of the display panel 110 along a direction perpendicular to an emission signal line, where M is an integer greater than 0 and less than N (S440). In some embodiments, N may be 2, M may be 1, and the panel driver 120 may set an upper half region or a lower half region of the display panel 110 as the black region. In other embodiments, N may be 4, M may be 1, 2 or 3, and the panel driver 120 may set a 1/4 region, a 2/4 region or a 3/4 region of the display panel 110 as the black region. In some embodiments, a boundary line of the black region may correspond to (or may be substantially the same as) a folding line of the display panel 110 (e.g., a foldable display panel).

In such embodiments, in the partial driving mode, the panel driver 120 may drive the display panel 110 to display an image corresponding to the input image data IDAT in a remaining region of the display panel 110 other than the black region and to display a black image in the black region (S450). In an embodiment, for example, the data driver 150 of the panel driver 120 may provide the data voltages DV corresponding to the input image data IDAT to the pixels PX located in the remaining region of the display panel 110, and may provide black data voltages (e.g., the data voltages DV corresponding to a 0-gray level) to the pixels PX located in the black region of the display panel. In the method of operating the display device 100 according to embodiments, a drop amount of a power supply voltage applied to the display panel 110 may be substantially constant in the partial driving mode, and the display panel 110 may emit light with uniform luminance in the partial driving mode.

Figure 13:
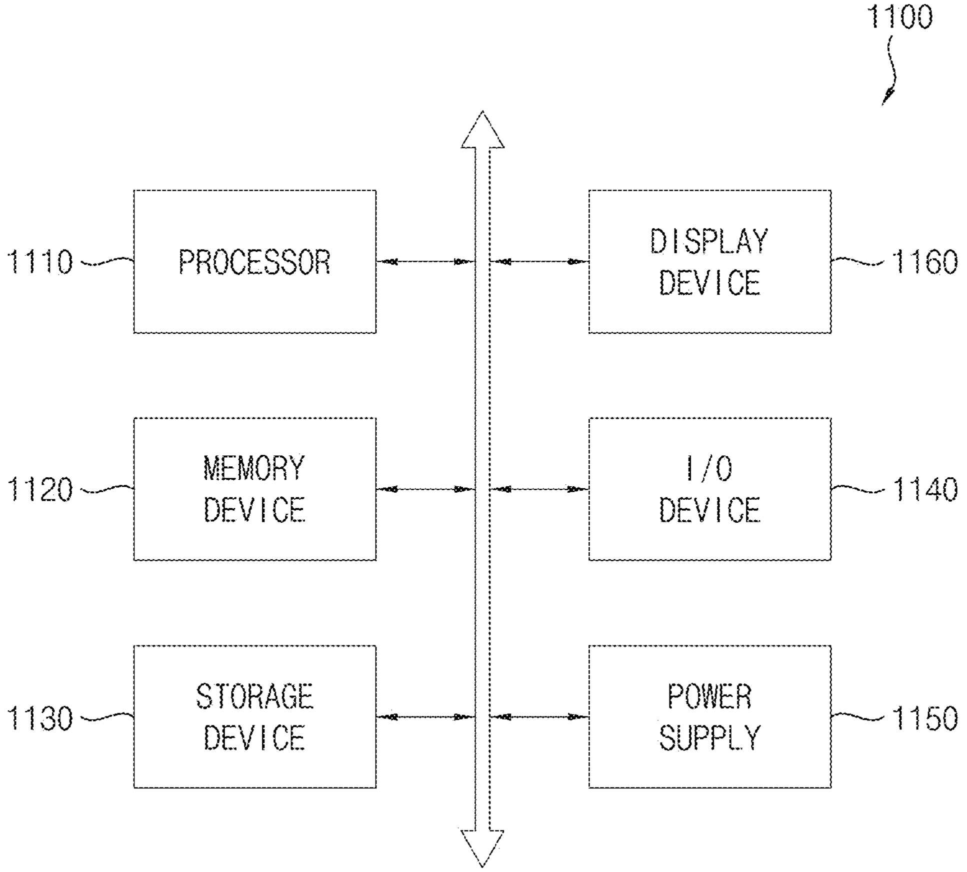
FIG. 13 is a block diagram illustrating an electronic device including a display device according to embodiments.

FIG. 13 is a block diagram illustrating an electronic device including a display device according to embodiments.

Referring to FIG. 13, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electronic devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. In an embodiment, for example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, each frame period may include N emission cycles, where N is an integer greater than 1. Further, in a partial driving mode, a black region of a display panel may be set from a M/N point of the display panel along a direction perpendicular to an emission signal line, where M is an integer greater than 0 and less than N, an image corresponding to input image data may be displayed in a remaining region of the display panel other than the black region, and a black image may be displayed in the black region. Accordingly, in the partial driving mode, the number of pixel rows emitting light may be substantially constant over time, a power supply voltage applied to the display panel may be substantially constant, and thus the display panel may emit light with uniform luminance.

Embodiments of the invention may be applied to any electronic device 1100 including the display device 1160. In an embodiment, for example, the inventions may be applied to a television (TV), a digital TV, a three-dimensional (3D) TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
- a display panel including pixels; and
- a panel driver which drives the display panel,
- wherein each frame period for the display panel includes N emission cycles, wherein N is an integer greater than 1, and N is greater than or equal to 2 when the display device is in a partial driving mode, and
- wherein, in the partial driving mode, the panel driver determines a position of a boundary line between a normal region and a black region based on the number of the emission cycles in each frame period such that the black region of the display panel is set from a M/N point of the display panel along a direction perpendicular to an emission signal line, wherein M is an integer greater than 0 and less than N, and drives the display panel to display an image corresponding to input image data in the normal region of the display panel and to display a black image in the black region.

2. The display device of claim 1, wherein, in the partial driving mode, the panel driver provides data voltages corresponding to the input image data to the pixels located in the remaining region of the display panel, and provides black data voltages to the pixels located in the black region of the display panel.

3. The display device of claim 1, wherein, in a normal driving mode, the panel driver drives the display panel to display an image corresponding to the input image data in an entire region of the display panel.

4. The display device of claim 1, wherein
- N is 2 in the partial driving mode,
- M is 1 in the partial driving mode, and
- in the partial driving mode, the panel driver sets an upper half region or a lower half region of the display panel as the black region.

5. The display device of claim 1, wherein the display panel is a foldable display panel which is foldable at a folding line, and
- wherein the display device operates in the partial driving mode when the foldable display panel is folded.

6. The display device of claim 5, wherein a boundary line of the black region corresponding to the M/N point of the foldable display panel corresponds to the folding line of the foldable display panel.

7. The display device of claim 1, wherein
- N is 4 in the partial driving mode,
- M is 1, 2 or 3 in the partial driving mode, and
- in the partial driving mode, the panel driver sets a 1/4 region, a 2/4 region or a 3/4 region of the display panel as the black region.

8. The display device of claim 1, wherein the display panel is a multi-foldable display panel which is foldable at a first folding line, a second folding line and a third folding line, and
- wherein the display device operates in the partial driving mode when the multi-foldable display panel is folded.

9. The display device of claim 8, wherein
- the first folding line is located at a ¾ point from a top edge of the multi-foldable display panel along the direction perpendicular to the emission signal line,
- the second folding line is located at a 2/4 point from the top edge of the multi-foldable display panel along the direction perpendicular to the emission signal line, and
- the third folding line is located at a ¼ point from the top edge of the multi-foldable display panel along the direction perpendicular to the emission signal line.

10. The display device of claim 9, wherein, when the multi-foldable display panel is folded at the first folding line, the panel driver sets a 1/4 region of the multi-foldable display panel as the black region,
- wherein, when the multi-foldable display panel is folded at the second folding line, the panel driver sets a 2/4 region of the multi-foldable display panel as the black region, and
- wherein, when the multi-foldable display panel is folded at the third folding line, the panel driver sets a 3/4 region of the multi-foldable display panel as the black region.

11. A method of operating a display device, the method comprising:
- providing an emission signal to a display panel at a frequency, which is N times a frame frequency, such that each frame period for the display panel includes N emission cycles, wherein N is an integer greater than 1, and N is greater than or equal to 2 when the display device is in a partial driving mode;
- in the partial driving mode, determining a position of a boundary line between a normal region and a black region based on the number of the emission cycles in each frame period, and setting the black region of the display panel from a M/N point of the display panel along a direction perpendicular to an emission signal line, wherein M is an integer greater than 0 and less than N; and in the partial driving mode, driving the display panel to display an image corresponding to input image data in the normal region of the display panel and to display a black image in the black region.

12. The method of claim 11, wherein the driving the display panel in the partial driving mode includes:

providing data voltages corresponding to the input image data to pixels located in the remaining region of the display panel; and providing black data voltages to pixels located in the black region of the display panel.

13. The method of claim 11, further comprising:

in a normal driving mode, driving the display panel to display an image corresponding to the input image data in an entire region of the display panel.

14. The method of claim 13, wherein the driving the display panel in the normal driving mode includes:

providing data voltages corresponding to the input image data to all of pixels of the display panel.

15. The method of claim 11, wherein

N is 2 in the partial driving mode,

M is 1 in the partial driving mode, and in the partial driving mode, an upper half region or a lower half region of the display panel is set as the black region.

16. The method of claim 11, wherein the display panel is a foldable display panel which is foldable at a folding line, and wherein the display device operates in the partial driving mode when the foldable display panel is folded.

17. The method of claim 16, wherein a boundary line of the black region corresponding to the M/N point of the foldable display panel corresponds to the folding line of the foldable display panel.

18. The method of claim 11, wherein

N is 4 in the partial driving mode,

M is 1, 2 or 3 in the partial driving mode, and in the partial driving mode, a 1/4 region, a 2/4 region or a 3/4 region of the display panel is set as the black region.

19. The method of claim 11, wherein the display panel is a multi-foldable display panel which is foldable at a first folding line, a second folding line and a third folding line, wherein the first folding line is located at a 3/4 point from a top edge of the multi-foldable display panel along the direction perpendicular to the emission signal line, the second folding line is located at a 2/4 point from the top edge of the multi-foldable display panel along the direction perpendicular to the emission signal line, and the third folding line is located at a 1/4 point from the top edge of the multi-foldable display panel along the direction perpendicular to the emission signal line, and wherein the setting the black region of the display panel includes:

setting a 1/4 region of the multi-foldable display panel as the black region when the multi-foldable display panel is folded at the first folding line;

setting a 2/4 region of the multi-foldable display panel as the black region when the multi-foldable display panel is folded at the second folding line; and setting a 3/4 region of the multi-foldable display panel as the black region when the multi-foldable display panel is folded at the third folding line.

20. An electronic device comprising a display device, wherein the display device comprises:

a display panel including pixels; and a panel driver which drives the display panel, wherein each frame period for the display panel includes N emission cycles, wherein N is an integer greater than 1, and N is greater than or equal to 2 when the display device is in a partial driving mode, and wherein, in the partial driving mode, the panel driver determines a position of a boundary line between a normal region and a black region based on the number of the emission cycles in each frame period such that the black region of the display panel is set from a M/N point of the display panel along a direction perpendicular to an emission signal line, wherein M is an integer greater than 0 and less than N, and drives the display panel to display an image corresponding to input image data in the normal region of the display panel and to display a black image in the black region.

* * * * *